US006796500B1

(12) United States Patent
Chen

(10) Patent No.: US 6,796,500 B1
(45) Date of Patent: Sep. 28, 2004

(54) BUSINESS CARD READER WITH A REPLACEABLE CHARGING CRADLE

(75) Inventor: Ching Hui Chen, Taipei Hsien (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/687,881

(22) Filed: Oct. 20, 2003

(30) Foreign Application Priority Data

Jun. 6, 2003 (TW) ...................................... 92210401 U

(51) Int. Cl.⁷ ............................................... G06K 7/00
(52) U.S. Cl. ...................................................... 235/439
(58) Field of Search ................................. 235/439, 454, 235/462.43, 472.01, 472.02, 486; 248/126, 127, 136; D13/107, 108

(56) References Cited

U.S. PATENT DOCUMENTS

| | | | | |
|---|---|---|---|---|
| 6,053,413 A | * | 4/2000 | Swift et al. ............ | 235/472.01 |
| 6,102,284 A | * | 8/2000 | Myers et al. ............... | 235/375 |
| 6,734,915 B2 | * | 5/2004 | Nagaoka ...................... | 348/375 |
| 2001/0055978 A1 | * | 12/2001 | Herrod et al. ............... | 455/517 |
| 2002/0178222 A1 | * | 11/2002 | O'Hara et al. .............. | 709/205 |
| 2003/0006998 A1 | * | 1/2003 | Kumar ........................ | 345/700 |
| 2004/0028295 A1 | * | 2/2004 | Allen et al. ................. | 382/313 |

FOREIGN PATENT DOCUMENTS

| | | | | | |
|---|---|---|---|---|---|
| JP | 2000175365 A | * | 6/2000 | ............. | H02J/7/00 |
| WO | WO 200209023 A1 | * | 1/2002 | ............ | G06K/7/10 |

* cited by examiner

*Primary Examiner*—Diane I. Lee
(74) *Attorney, Agent, or Firm*—Birch, Stewart, Kolasch & Birch, LLP

(57) ABSTRACT

A business card reader (BCR) with a replaceable cradle, particularly to a BCR combined with a cradle, in which the cradle is replaceable for adapting to various digital electrical equipments, includes a charging cradle and a base assembled under the charging cradle. The cradle has a connector mounted thereon and a flat cable connected with the connector. The base has a scanning unit, a paper-feeding sear disposed before the scanning unit and a printed circuit board (PCB) adjacent he paper-input seat, wherein the PCB has a socket mounted thereon for receiving an end of the flexible cable therein.

10 Claims, 4 Drawing Sheets

BUSINESS CARD READER WITH A REPLACEABLE CHARGING CRADLE

This Nonprovisional application claims priority under 35 U.S.C. § 119(a) on Patent Application No(s). 092210401 filed in Taiwan on Jun. 6, 2003, the entire contents of which are hereby incorporated by reference.

BACKGROUND OF THE INVENTION

1. Field of the Invention

The present invention relates to a business card reader (BCR) with a replaceable charging cradle, and particularly to a business card reader combined with a charging cradle, wherein the charging cradle is replaceable and applying to a digital electronic device for charging and transmitting data.

2. Description of the Prior Art

In the busy business today, the personal digital assistant (PDA) is more and more popular. However it is not so convenient when inputting business cards, the user usually must input one card by one card by writing or typing. Therefore, there is an invention of business card reader (BCR) which is supported the PDA. The user just put business cards into the BCR, the data of card will be stored in personal computer (PC) after optical recognizing. Then after hot sync the PDA with PC, the data will be transmitted into the PDA. However the BCR is separate with the PDA and can not charge the PDA. It is not so convenient.

Therefore, the present invention is directed against the disadvantages of the prior art, and designs a BCR combined with a charging cradle and also solves the problem between different cradles of different PDA. The present invention even can apply on other digital electronic devices that need charging, for example: a cell phone combined with a PDA, or a cell phone, especially the cell phone can transmit images, so that the user can input images into the cell phone without photographing device.

SUMMARY OF THE INVENTION

An object of the present invention is to provide a business card reader (BCR) with a replaceable charging cradle, particular to a business card reader combined with a charging cradle, wherein the charging cradle is module designing and replaceable for adapting to different digital electronic devices, so that the designers do not need develop molds again so as to economize cost.

In order to achieve the above objects, the present invention according to one aspect thereof provides a business card reader with a replaceable charging cradle comprising a charging cradle having a connector for connecting with a digital electronic product, and a flat cable connected to a bottom of the charging cradle, wherein the flat cable is formed with a plug on a distal end thereof; a shell formed with an upper opening for receiving the charging cradle, a plurality of outlets formed on a side wall thereof, and a front opening formed thereon; a base accommodated in the shell, comprising a bottom board, a pivoting seat protruding from a top surface of the bottom board, a scanning unit mounted on the pivoting seat, and a paper-feeding seat disposed before the scanning unit, wherein the paper-feeding seat is formed with a cutout adjacent the scanning unit; and a printed circuit board (PCB) comprising a power connector mounted on an edge thereof, at least one outputting connector mounted adjacent an edge thereof, a socket mounted thereon for received the plug of the flat cable, and a sensor mounted thereon corresponding to the cutout.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
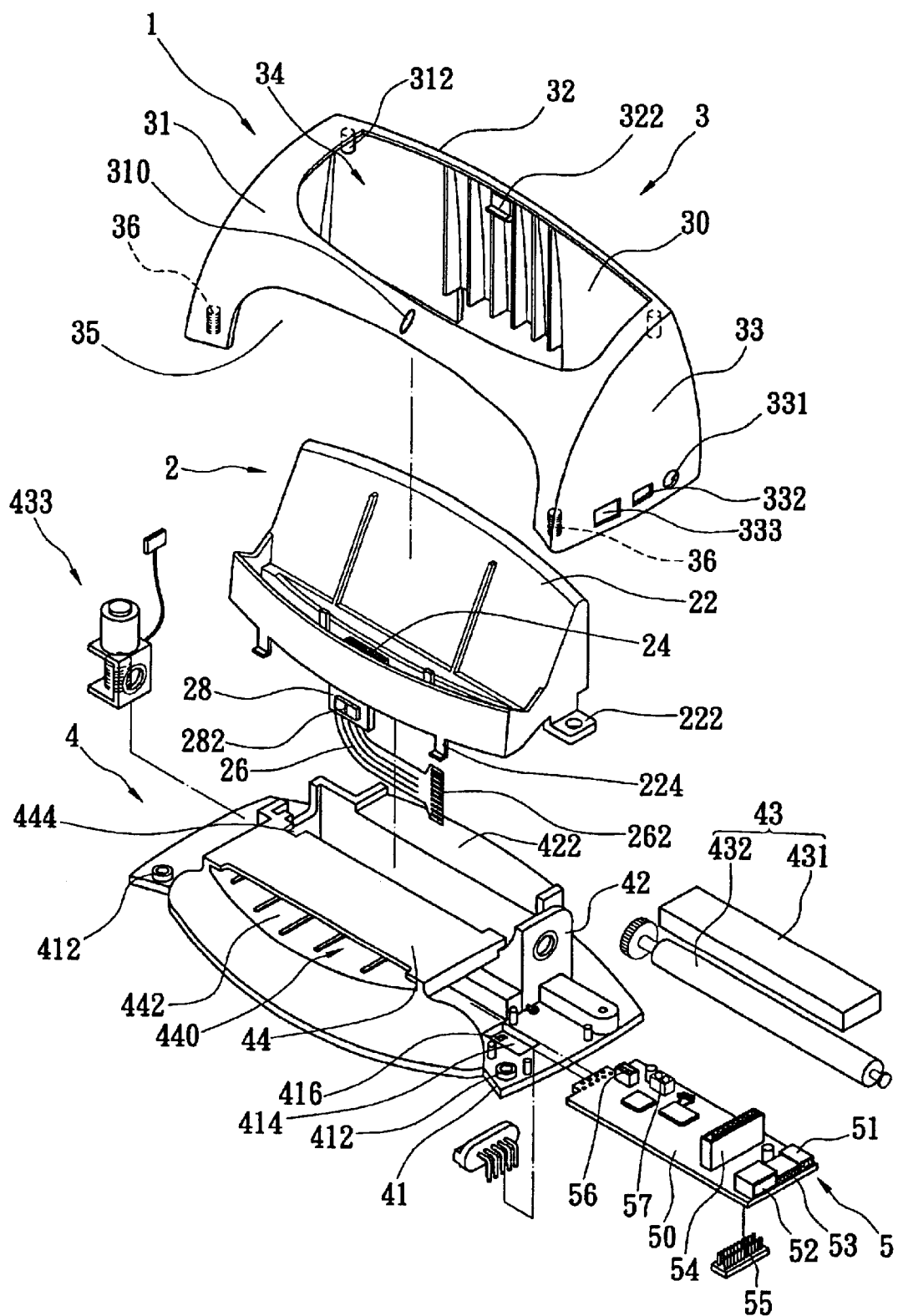
FIG. 1 is a perspective view of a business card reader with a replaceable charging cradle of the present invention.

Referring to FIG. 1 is a perspective view of a business card reader with a replaceable charging cradle of the present invention. The business card reader with a replaceable charging cradle 1 comprises a charging cradle 2, a shell 3, a base 4 assembled under the shell 3, and a printed circuit board (PCB) 5 mounted in the base 4.

The charging cradle 2 has a bearing seat 22, a connector 24 which is mounted on the bearing seat 22 for connecting to a mating connector of a digital electronic product (referring to FIG. 6), and a flat cable 26 which is connected to a bottom of the charging cradle 2. The flat cable 26 is formed with a plug 262 on a distal end thereof.

The charging cradle 2 has a transparent fixer 28 for fixing the flat cable 26 under the connector 24, and an indicator 264 is mounted on the flat cable 26 and under the fixer 28, wherein the fixer 28 is formed with a protrusion 282 thereon for guiding light of the indicator 264 outside the shell 3.

The shell 3 is formed with an upper opening 30 for receiving the charging cradle 2. The shell 3 has a front wall 31, a rear wall 32 and two side walls 33 that together define a cavity 34 therein. One of the side walls 33 is formed with a plurality of outlets 331, 332, 333. The front wall 31 is formed with a front opening 35 thereon and an indicating hole 310 for receiving the protrusion 282 of the fixer 28. The bearing seat 22 of the charging cradle 2 and the shell 3 respectively has a plurality of connecting elements that are connected to each other. For example, in this embodiment, the bearing seat 22 has a pair of ears 222 outwardly extending from a lower portion of two sides thereof, and the shell 3 has a pair of screwing portions 312 formed therein adjacent the upper opening 30 for connecting to the ears 222. Also, the bearing seat 22 of the charging cradle 2 and the shell 3 can further have a plurality of hooks 224, 322 for engaging to each other. The connecting elements can also be hooks and mating hooking holes (not shown). Therefore, the charging cradle 2 is screwed on the shell 3 in replaceable way, and just designing and replacing the charging cradle 2 according to various mating connectors of digital electronic products, then replacing the charging cradle 2 onto the shell 3, without redesigning business card reader. The factory does not need develop molds again so as to economize resources, sometimes redesigning will delay the time of entering market especially the digital electronic product of short popular period, for example to cell phone.

The base 4 is accommodated in the shell 3 and comprises a bottom board 41, a pivoting seat 42 which is protruding from a top surface of the bottom board 41, a scanning unit 43 which is mounted on the pivoting seat 42, and a paper-feeding seat 44 which is disposed before the scanning unit 43, wherein the paper-feeding seat 42 is formed with a cutout 444 adjacent the scanning unit 43. The paper-feeding seat 44 has a paper-feeding slot 440 which is formed with therein for inputting papers, and a front platform 442 which is extending forwardly and connecting to a front edge of the bottom board 41.

The scanning unit 43 has a roller 432 which is pivotally mounted on the pivoting seat 42, a motor 433 which is mounted adjacent the pivoting seat 42 for driving the roller 432, and a detecting device 431 with a built-in contact image sensor (CIS) which is disposed above or under the roller 432.

Figure 2:
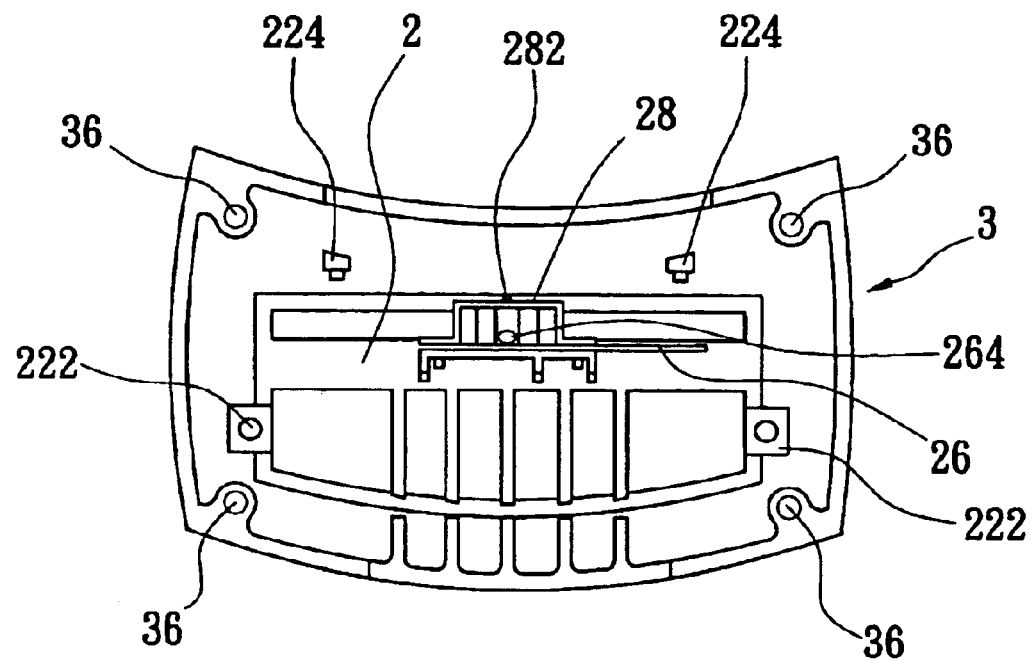
FIG. 2 is a bottom view of the charging cradle and the shell of the present invention.
Figure 3:
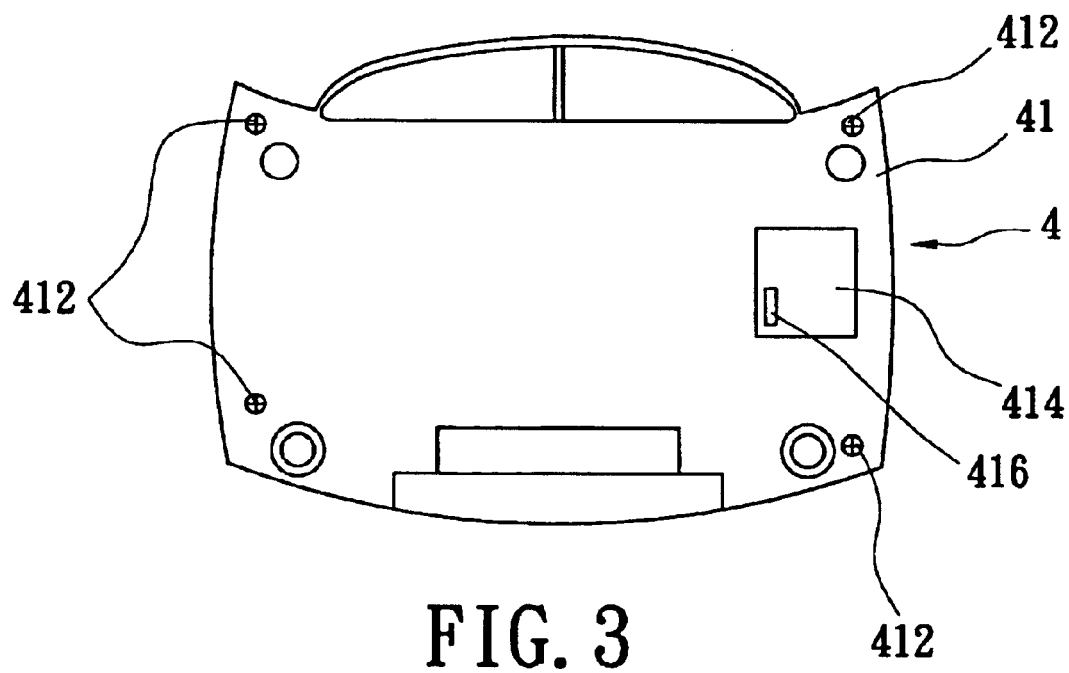
FIG. 3 is a top view of the base of the present invention.

The PCB 5 is disposed under the paper-feeding seat 44 and defines a board 50. The board 50 has a power connector 51 which is mounted on an edge thereof, at least one outputting connector (52, 53) which is mounted thereon, a socket 54 which is mounted thereon for received the plug 262 of the flat cable 26, a motor-power connector 56 for supplying power to the motor 433, and a sensor 57 which is mounted thereon corresponding to the cutout 444. The PCB 5 further has a switch 55 which is mounted under the board 50 for control the business card reader. The switch 55 is adapted hidden designing which is disposed under the board 5 and exposed beyond the base 4 through a switching hole 416 of a switching recess 414 which is formed on the bottom board 41. The outputting connectors could be a normal USB (universal serial bus)-type connector 52, or a mini USB-type 53 connector Referring to FIGS. 2 and 3, are respectively a bottom view of the charging cradle and the shell, and a top view of the base of the present invention. The shell 3 is formed with the screwing seats 36 therein, and the base 4 is formed with screwing holes 412 corresponding the screwing seats 36.

Figure 4:
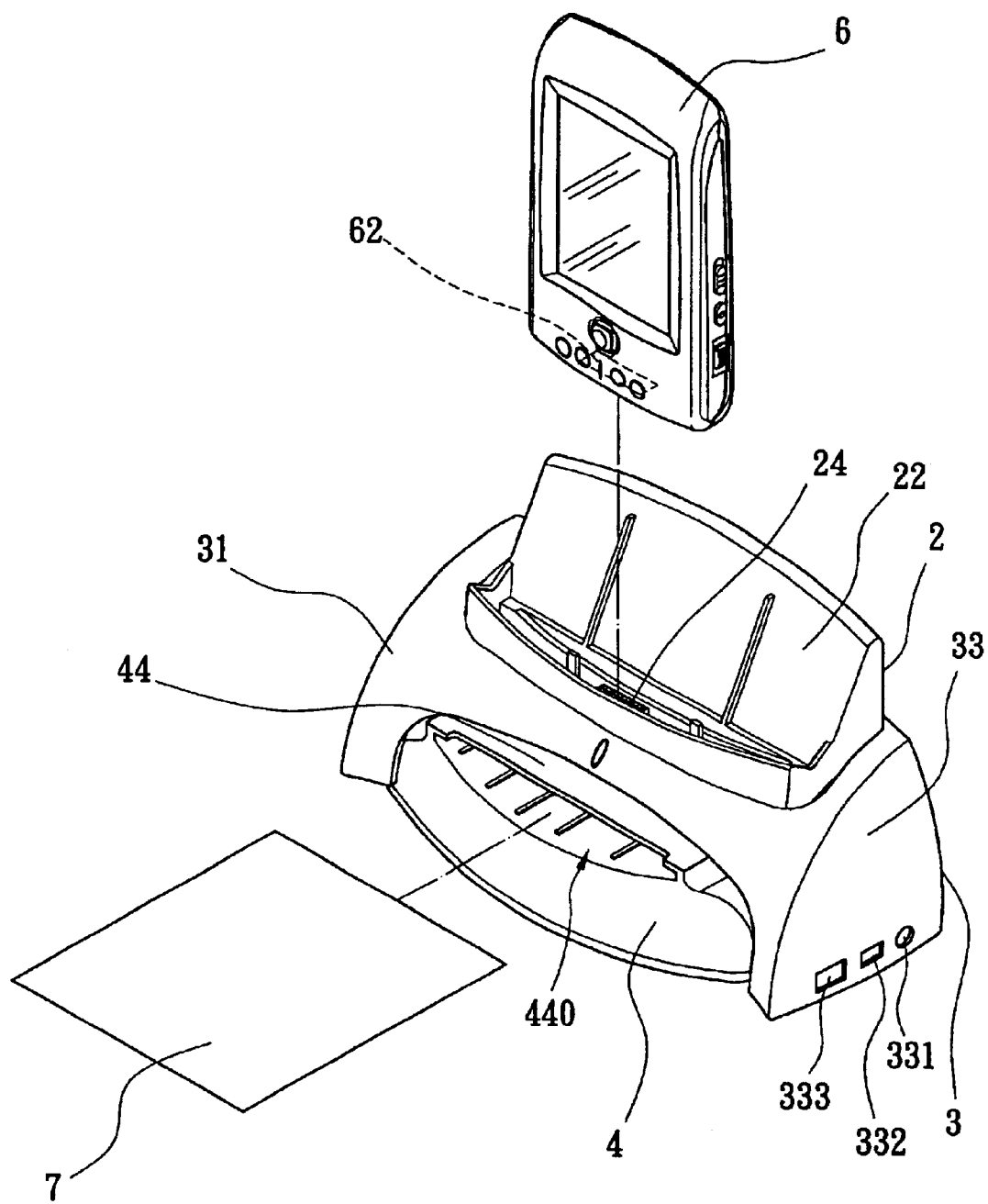
FIG. 4 is an assembling perspective view of the present invention.
Figure 5:
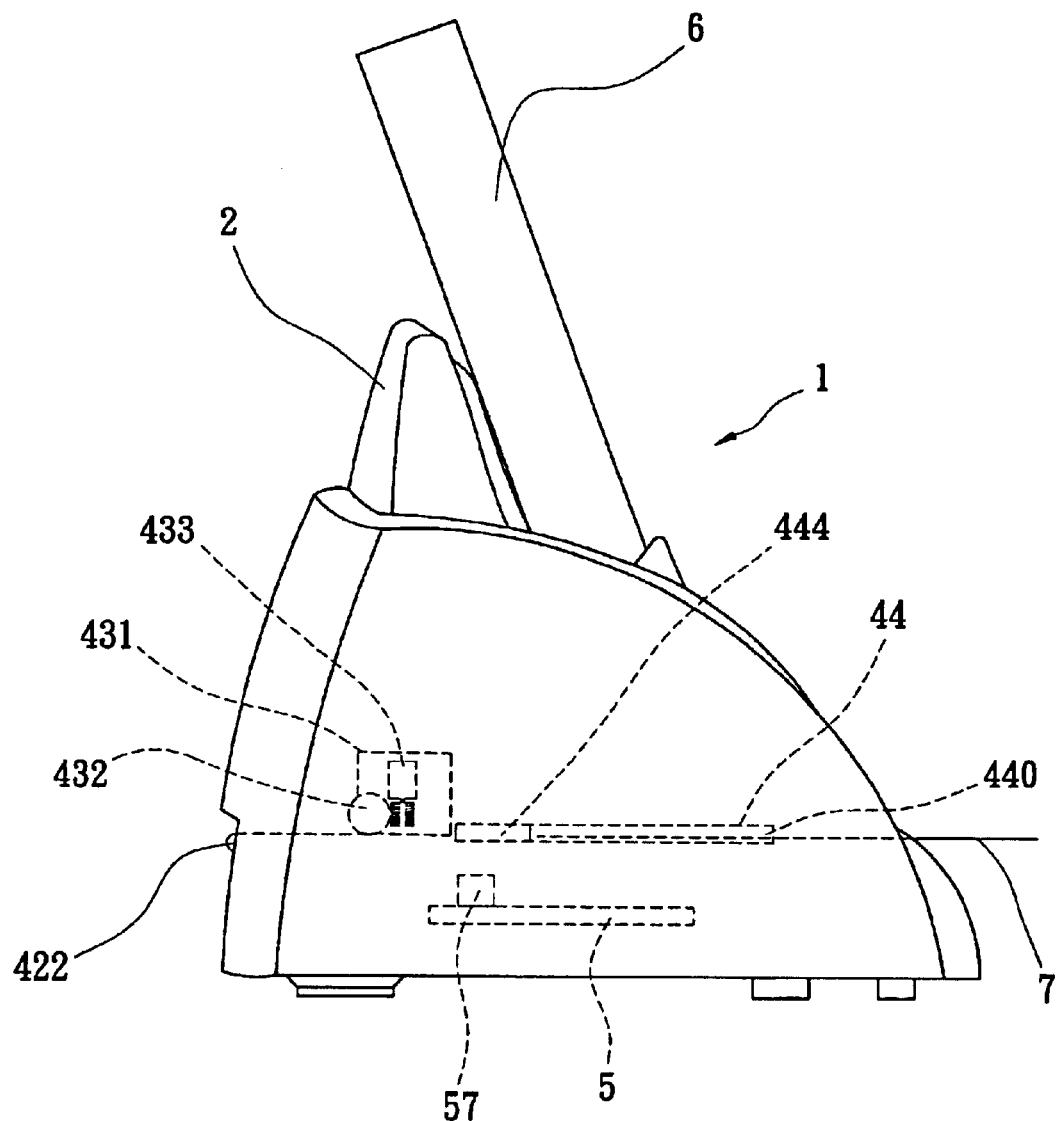
FIG. 5 is an operating perspective view of the present invention.

Referring to FIGS. 4 and 5, are an assembling perspective view and an operating perspective view of the present invention. The charging cradle 2 of the business card reader with a replaceable charging cradle 1 is connecting with a mating connector 62 of a personal digital assistant (PDA) 6 for charging and transmitting data therebetween. When a business card 7 is put into the paper-feeding slot 440, the sensor 57 of the PCB 5 senses the business card 7 and starts the scanning unit 43 for scanning the business card 7. After processing the scanning data, transmitting the data to the PDA 6 or a personal computer (not shown). The user can turn off the switch 55 for economizing power and protecting the scanning unit 43. The pivoting seat 42 of present invention is extending rearward with a rear platform 422 outside the shell 3. A distance from the rear platform 422 to the roller 432 is shorter than a half of a business card; therefore after scanning the business card 7, the business card 7 will fall naturally and does not affect the follow inputting business card.

The sum up of the characters and advantages are as follow. The charging cradle is replaceable, and just designing and replacing the charging cradle according to various mating connector of digital electronic products. The factory does not need develop molds again so as to waste resources, sometimes will delay the developing time especially of short period of the digital electronic product, for example to cell phone.

What is claimed is:

1. A business card reader with a replaceable charging cradle comprising:

a charging cradle having a connector for connecting with a digital electronic product, and a flat cable connected to a bottom of the charging cradle, wherein the flat cable is formed with a plug on a distal end thereof;

a shell formed with an upper opening for receiving the charging cradle, a plurality of outlets formed on a side wall thereof, and a front opening formed thereon;

a base accommodated in the shell, comprising a bottom board, a pivoting seat protruding from a top surface of the bottom board, a scanning unit mounted on the pivoting seat, and a paper-feeding seat disposed before the pivoting seat; and a printed circuit board (PCB) comprising a power connector mounted on an edge thereof, at least one outputting connector mounted adjacent an edge thereof, and a socket mounted thereon for received the plug of the flat cable, wherein the charging cradle and the shell respectively have a plurality of connecting elements connected to each other.

2. The business card reader with a replaceable charging cradle as in claim 1, wherein the paper-feeding seat is formed with a cutout adjacent the scanning unit, and the PCB has a sensor mounted thereon corresponding to the cutout.

3. The business card reader with a replaceable charging cradle as in claim 1, wherein the charging cradle has a fixer for fixing the flat cable to the connector, and an indicator mounted on the flat cable and under the fixer, wherein the fixer is made of transparent material for guiding light outside the shell through a through hole of the shell.

4. The business card reader with a replaceable charging cradle as in claim 1, wherein the shell is formed with a plurality of screwing seats on a lower portion thereof, and the base is formed with a plurality of screwing holes corresponding to the screwing seats.

5. The business card reader with a replaceable charging cradle as in claim 1, wherein the scanning unit has a roller pivotably mounted on the pivoting seat, a motor mounted adjacent the pivoting seat for driving the roller, and a detecting device with a built-in contact image sensor adjacent the roller.

6. The business card reader with a replaceable charging cradle as in claim 1, wherein the PCB further has a switch mounted thereon, and the base has a switching recess for exposing the switch beneath the base.

7. The business card reader with a replaceable charging cradle as in claim 1, wherein the outputting connectors of the PCB comprising an USB (universal serial bus) connector.

8. The business card reader with a replaceable charging cradle as in claim 1, wherein the digital electronic product is a personal digital assistant (PDA).

9. The business card reader with a replaceable charging cradle as in claim 1, wherein the digital electronic product is a cell phone.

10. The business card reader with a replaceable charging cradle as in claim 1, wherein the sensor of the PCB is an optical or mechanical sensor.

* * * * *